Figure 1:
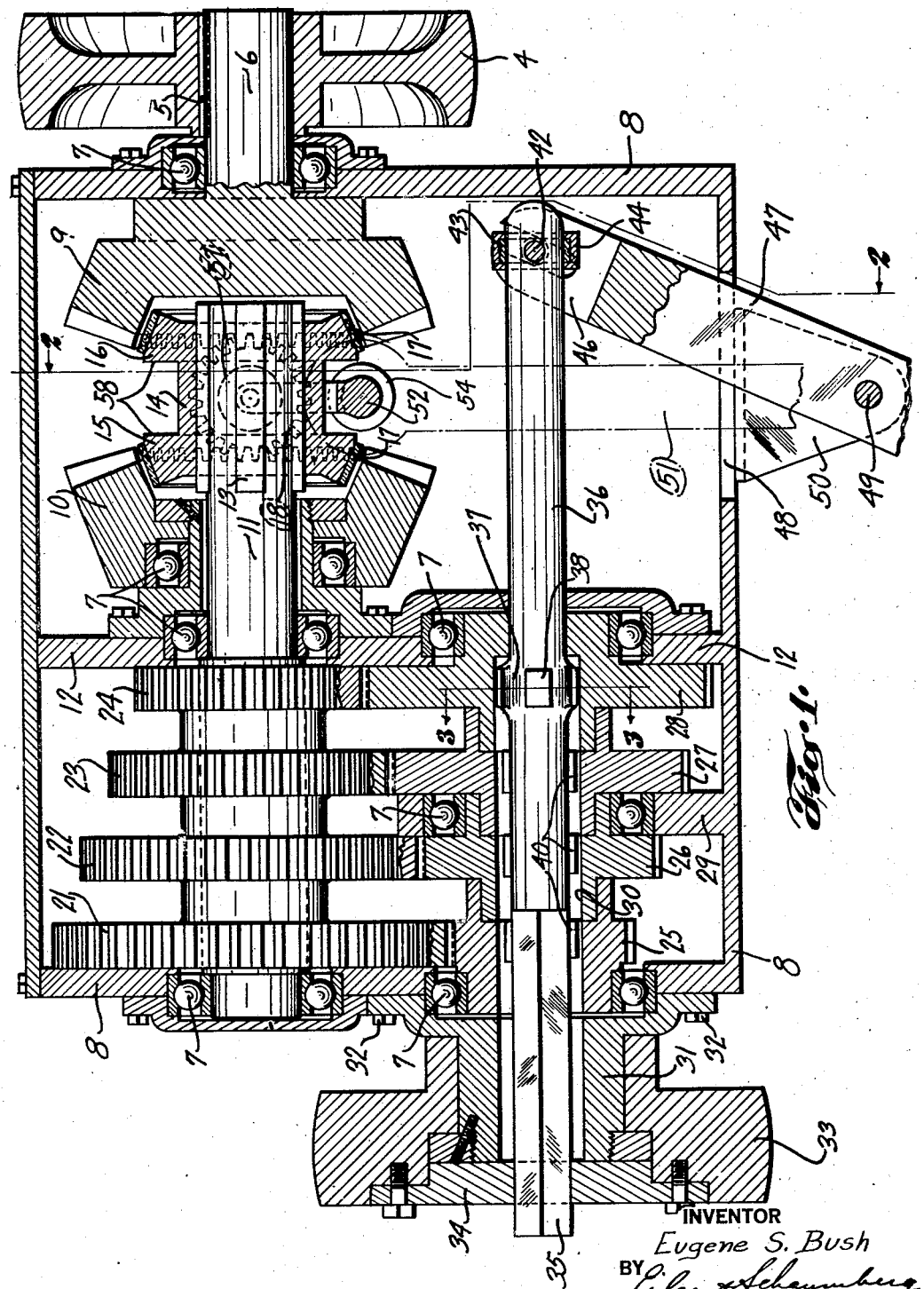

Dec. 18, 1934.     E. S. BUSH     1,985,015
POWER TRANSMISSION EQUIPMENT
Filed April 6, 1932     2 Sheets-Sheet 1

INVENTOR
Eugene S. Bush
BY
ATTORNEYS

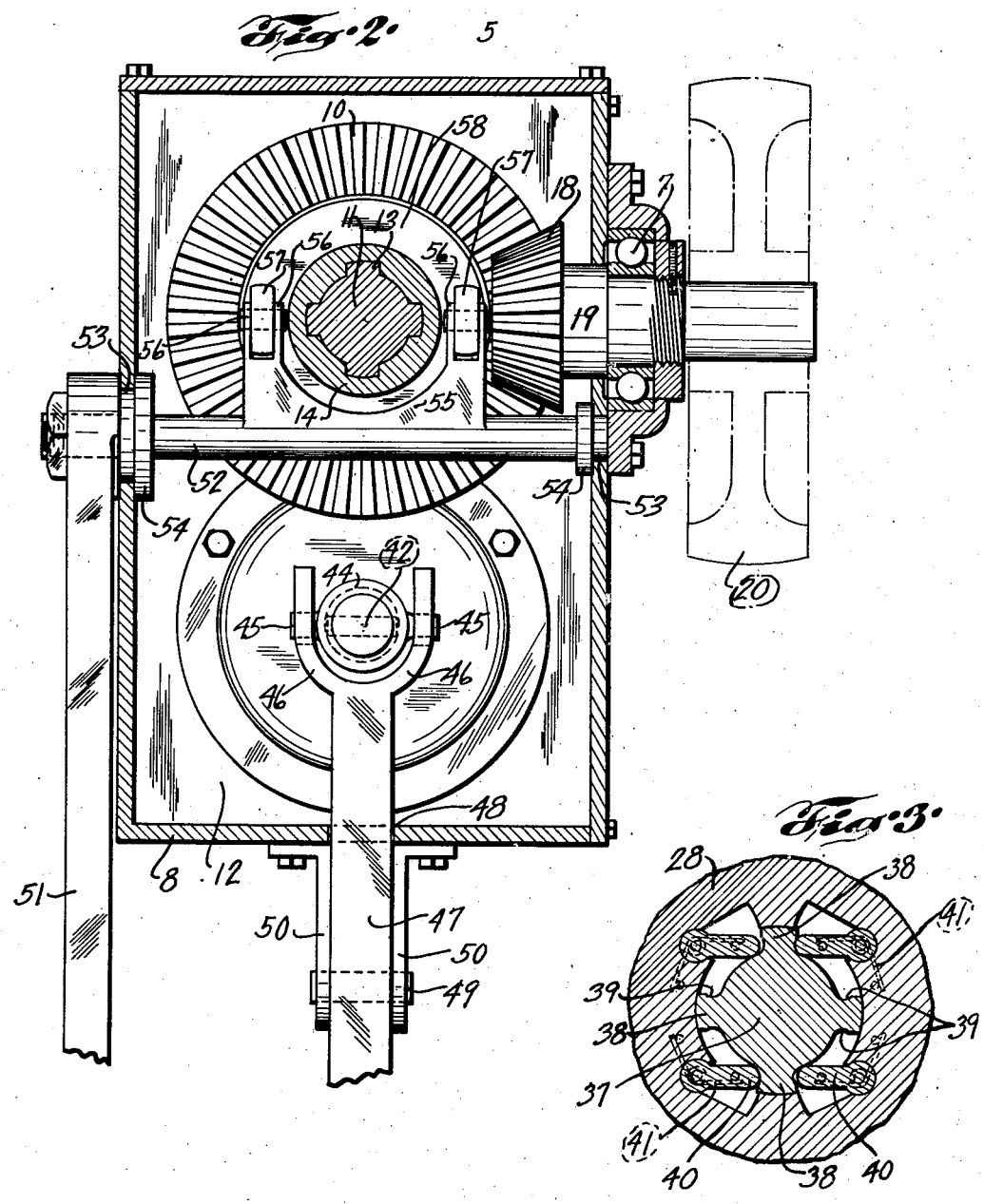

Patented Dec. 18, 1934

1,985,015

UNITED STATES PATENT OFFICE 1,985,015

POWER TRANSMISSION EQUIPMENT

Eugene S. Bush, St. Louis, Mo., assignor to Bush Manufacturing Company, St. Louis, Mo., a corporation of Missouri Application April 6, 1932, Serial No. 603,548

8 Claims. (Cl. 192—71)

This invention relates to improvements in power transmission equipment, and more particularly to an improved gear and shaft connection of a type adapted to facilitate the connection of different speed selecting gear elements of a transmission.

An object of the invention is attained in the provision of a speed-gear and shaft connection, or gear clutch of rugged and sturdy construction so that it possesses a capacity to care for substantial torque or load, and yet is compact in design, so that it will occupy a minimum of space.

A further object of the invention is attained in the provision of an improved gear clutch assembly especially adapted for use with speed-change gearing of so-called constant mesh type, obviating any necessity of the bodily movement of gears, and minimizing space requirements.

The foregoing and other objects and advantages of the invention will more clearly appear as the description proceeds, and from the accompanying drawings, forming a part of this specification. In the drawings:

Fig. 1 is a sectional elevation of a preferred form of transmission unit, to which the present invention is applied, Fig. 1 being considered as taken along either a horizontal or a vertical plane, according to the choice of position of the assembly; Fig. 2 is a vertical sectional elevation as viewed along line 2—2 of Fig. 1, and Fig. 3 is a transverse section through the driving shaft and associated gearing as viewed along line 3—3 of Fig. 1.

Referring now by characters of reference to the drawings, the example illustrating a preferred form of transmission unit of a type to which the invention is particularly applicable, and includes a driving power pulley 4, secured as by a key 5, to a stub shaft 6, mounted, for example in an anti-friction bearing assembly such as 7, detachably mounted in the end wall of a transmission case 8, which may be, and is by preference, so constructed as to contain a body or bath of lubricant for splash-oiling the parts therein. Additional, similar ball bearing assemblies 7 are appropriately disposed intermediate the walls of the case and at the opposite end thereof as shown in Fig. 1, and as may otherwise be desirable according to changes in size and proportion of the transmission parts. Formed on or carried by the shaft 6, inwardly of the case, is a bevel gear 9, rotatable with the pulley 4. Arranged in spaced opposition to the gear 9 is a companion bevel gear 10, secured as by a key to an intermediate gear shaft 11, rotatably mounted in an intermediate partition or bracket member 12, extended transversely of the case 8. The shaft 11 may be provided, as shown, with a plurality of splines 13, the splined end of shaft 11 serving to carry a driven clutch member 14 provided at its opposite ends with friction clutch heads 15 and 16. It will be seen that the adjacent faces of gears 9 and 10 are centrally recessed, the walls of the recesses being of convergent trend and their slope conforming to the peripheral angularity of members 15 and 16. The heads 15 and 16 are provided with friction facings 17, adapted when one or the other of the heads is moved into engagement with the recess in the adjacent gears 9 or 10, to constitute therewith a double, reversing cone-type friction clutch, which may be described broadly as a reverse gear assembly. The space relations between gears 9 and 10 and between heads 15 and 16, are such that it is impossible for the member 14 to be in driven engagement with more than one of the gears 9—10 at a given time. This spacing is further such that when the clutch member 14 is in an intermediate position as shown in Fig. 1, it is operatively engaged with neither of the gears 9 or 10 and thus occupies a neutral relation thereto.

It will appear from Figs. 1 and 2 that the gears 9 and 10 are always operatively connected with each other through a pinion 18, disposed at a right angle to each of the gears 9—10, so that the gear 9 always rotates in a direction opposite that of gear 10. The pinion 18 is carried by a stub shaft 19 mounted as through a set of ball bearings 7 in a wall of the case 8, the shaft 19 projecting optionally through the wall of the case 8 for the reception of a power pulley 20. In certain installations it may be desirable to drive the unit through the pulley such as 20, shown as disposed with its axis at a right angle to that of the pulley 4. Whether power be applied to the unit through the pulley 4 or 20, it will appear that the same operative relation prevails in that the gears 9 and 10 are always rotated in opposite directions, and that the shaft 11 may be selectively driven in a clockwise or counterclockwise direction, as desired.

The shaft 11, projecting through the bracket 12 and to the opposite end wall of the case 8, serves to carry an assembly of coaxial gears which may conveniently be mounted on a sleeve secured as by a suitable key (not shown) to the shaft 11, and so rotatable therewith. The transmission unit presently illustrated includes provision for four predetermined speed ratios in either direction, with respect to the driving pulley such as 4. Accordingly, the sleeve serves to carry (from left to right, Fig. 1) driving gears 21, 22, 23 and 24, being in the order named, of downwardly graduated diameter, according to the desired speed ratios through the unit.

Disposed adjacent the assembly 21—24 and so as to mesh respectively with gears 21 through 24, is a series of coaxial driven gears 25, 26, 27 and 28. The first of the group of driven gears, viz., 25, is preferably journalled in the end wall of the case, as by anti-friction bearings 7, a lateral extension being carried by the gear for this purpose, and a second oppositely disposed lateral projection serving to receive, in journalling relation, a companion portion of gear 26. Gear 26 is rotatably disposed in a bearing in a partition or bracket 29, and also serves to receive in journalling relation a projection of gear 27. Gear 28 is journalled at one side, within a projection of gear 27, and at the other side, in an anti-friction bearing in bracket 12. The gears 25—28 are thus rotatively disposed in assembled coaxial adjacence. Each of the gears 25—28 is further provided with a central aperture or passage coacting in assembly to form a longitudinal bore 30 for a purpose hereinafter more fully appearing. The bore 30 may be extended outwardly of the case through a hollow journal member 31 secured as by cap screws 32 to the wall of the case, the member 31 serving as a mounting for a power take-off, or driven pulley 33. The outer end face of pulley 33 is shown as provided with a detachable plate member 34 provided axially with a squared or equivalent polygonal opening through which may project a correspondingly formed end portion 35 of an axially shiftable counter-shaft 36, extended in floating relation through the bore 30.

The shaft 36 is characterized by a gear-engaging clutch head indicated generally in Fig. 1 at 37, and characterized by angularly spaced radial projections 38, best shown in section in Fig. 3. These projections or abutments are each laterally grooved as at 39, for the reception of the preferably rounded ends of pawl members 40. In the example illustrated, four such pawl members are disposed in spaced relation about the central passage through each of the gears 25, 26, 27 and 28. By preference also the arms 38 are rounded or tapered off at their opposite ends so as substantially to merge with the adjacent peripheral surface of shaft 36, so that, as will appear, the arms 38 will not, when the shaft is shifted, objectionably abut the end surfaces of pawls 40, but will serve gradually to displace the pawls to permit free movement of the head 37 into any selected one of the gears 25—28. The pawls 40 are urged radially inwardly of the passage by which they are carried as by springs 41, (Fig. 3) so that, while the pawls may be deflected outwardly during change in position of the member 36, they will, after the clutch head is brought into the selected gear, tend to assume their positions of driving engagement, as illustrated in Fig. 3.

It will be observed that the preferred arrangement is such that the countershaft 36 projects through and beyond the bracket or partition 12 and is provided with a transverse shifting pin 42, terminating outwardly of the shaft in a collar 43, rotating with the shaft and journalled in a non-rotating annular member 44. The latter member is provided with diametrally oppositely projecting studs or trunnions 45, shown as pivotally received by opposite arms of a shifting yoke 46, the yoke extending outwardly of the case in an arm 47 operating through a suitable slot 48 therefor, in the wall of the case. The shifting arm 47 is provided with a fixed pivot 49 which may conveniently be carried by a suitable bracket 50, mounted adjacent the slotted portion of the case wall. The speed-change control lever 47 may be extended outwardly of the pivot 49, to a preferred point of manipulation for purposes of speed change selection.

The selection of direction of rotation of the driven pulley 33 with respect to one of the driving pulleys such as 4 or 20, is accomplished as above noted, by moving the driven element 14 of the friction clutch assembly to the right or left (Fig. 1) along the splined portion of shaft 11. This control is accomplished in the present example by a control lever 51, arranged externally of the case, and operatively connected with a pivot 52 journalled as at 53, in the opposite walls of the case, and provided with collars 54 near its opposite ends, to position the pivot against excessive endwise movement. Projecting laterally of the pivot 52 is a plate portion 55 (Fig. 2) which is centrally recessed as shown and provided with spaced bifurcated portions 56, between the paired furcations of which are pivotally mounted rollers 57. The rollers, according to the direction of movement of the lever 51, may be brought selectively into engagement with the opposite inner faces 58 of the clutch element 14, from which it is seen that as the lever 51 is moved to the left (Fig. 1) frictional driving engagement will take place between the clutch head 16 and the gear 9; conversely when the lever 51 is moved to the right, (Fig. 1), the clutch elements 15—16 will first be restored to an intermediate or neutral position and as the lever 51 is moved still further to the right, the head 15 will be brought into frictional driving relation with the gear 10, rotating in a direction opposite to that of gear 9.

With respect to the variation of speed ratio resulting from movement of the lever 47, it is seen from Fig. 1 that with the gear head 37 in the position shown, an operative connection exists from the driving pulley through one of the gears 9 or 10, thence to shaft 11, thence at a relatively low gear ratio through gears 24 and 28, from gear 28 into gear head 37, shaft 36, and thence to driven pulley 33 for power take-off purposes. As other gear ratios are desired, the same relation of parts prevails except for the substitution of other pairs of driving and driven gears through axial movement of shaft 36. As the countershaft is moved to the left (Fig. 1), the gear-clutching head 37 will first clear the pawls in gear 28; will thereafter occupy the space between the groups of pawls of gears 28 and 27, thence being brought into gear 27 and engaged, operatively, by the pawls therein, so that the gears 23 and 27 now determine the speed ratio between pulleys 4 and 33. An analogous relation prevailing as the head 37 is moved progressively into operative relation with gears 26 and 25, successively higher ratios are in turn effected. Obviously, as the shaft 36 is again shifted to the right, the ratios attained are successively lower, being in the reverse order.

It is contemplated that, for the usual industrial uses, the lever 51 will be restored to its intermediate or neutral position when the lever 47 is shifted from one speed ratio to another.

However, in order to avoid any posibility of locking the mechanism and avoiding any tendency to shear the lugs 38 through a casual simultaneous connection of two or more gears of the groups 25—27, with those of the group 21—24, it will appear that the groups of pawls in the adjacent gears are spaced apart a distance somewhat greater than the axial length of the projections 38 of the driving head 37; thus it is impossible for the abutments or lugs 38 to bridge two sets of pawls in adjacent gears at a given time. Due to the provision of the rounded ends of lugs 38 and the spring mounting of pawls 40, it will appear that, as the shaft 36 is moved endwise in either direction, through or into the aligned gears 25—28, no objectionable obstruction is offered to this movement. The controlling actuation of the assembly through lever 47 thus takes place by movement of the lever in a single plane, with all of the advantages of a transmission control of so-called progressive type.

It will appear that, as the gears are meshed at all times, each one with its cooperating or complementary gear, all tendency toward clashing is avoided. It will further appear that a transmission unit constructed as described, possesses the advantage of employing a shaft member such as 36, which would be necessarily included in the assembly as a countershaft in older prevailing constructions, for a dual purpose, viz., not only as a power take-off shaft, but, according to the present principle, as a shifting or control element, thus minimizing the number of necessary parts, dispensing with the numerous minor shifting elements heretofore required in bodily moving a gear or group thereof from one position to another to effect selection of speed ratios.

It will further appear that the device may be constructed entirely of elements of a sturdy and rugged nature, without difficult machine work, and may be utilized as a clutch for selecting gear and shaft connection without adding to the weight of transmission units of comparable capacity, constructed according to older principles.

I claim as my invention:

1. A clutching connection for use between a shaft element and a gear or wheel element coaxial therewith, and in which the elements are relatively axially displaceable to effect connection therebetween, a pair of spaced, spring loaded pawls carried by one of said elements at one side of its axis, an abutment secured to the other element and movable between said pawls, said pawls being oppositely angularly presented to said abutment, and engageable with opposite faces thereof, the abutment faces being recessed to form seats for the pawls, tending releasably to maintain the pawls and abutments in operative relation.

2. In a connection for clutching a shaft element to a gear or wheel element coaxial therewith, and of a type in which one of the elements is axially displaceable to effect a connection therebetween, a pair of pawls carried by one element at one side of its axis, an integral pivot portion extended from one margin of each pawl, pivot-conforming journal recesses formed in the pawl carrying element, an abutment secured to the other element and movable between said pawls, spring means associated with each of said pawls and adapted to permit swingable deflection thereof in opposite directions, and tending to urge the pawls, each into bearing relation with one lateral surface of said abutment.

3. A clutching connection for use between a shaft element and a gear or wheel element coaxial therewith, said connection including a pair of spring-pressed pawls on one element, normally disposed in substantially parallel relation, and oppositely angularly presented with respect to the axis of the pawl-carrying element, the pawls being provided with enlarged, partly cylindrical pivot portions, and the pawl-carrying element provided with correspondingly formed pawl-journalling recesses, an abutment carried by the other element and movable between the pawls, to effect a driving relation between the elements, and a camming surface adjacent the ends of the abutment, and adapted upon axial movement of one of the elements, to deflect the pawls, except when positioned to receive the abutment therebetween.

4. In a clutching device for use between a shaft element and a gear or wheel element coaxial therewith, and in connection with which the elements are relatively axially displaceable to effect connection therebetween, a pair of spring pressed pawls carried by one of the elements, pawl-journalling recesses formed in the last said element, an abutment carried by the other element, and adapted to be moved between the paired pawls, and a curved, pawl-deflecting channel formed on said abutment, and providing a recessed seat tending to retain in operative position, the pawl engaged thereby.

5. In a clutching connection for use between a shaft element and a gear or wheel element coaxial therewith, and according to which the elements are relatively axially displaceable to effect connection therebetween, a pair of yieldably mounted pawls pivotally carried in opposed spaced relation by one element, a hollow pawl-journalling recess formed in the last said element to define a path of movement of each pawl, an abutment carried by the other element, and movable into the space between said pawls, the abutment being longitudinally channeled to receive and tend to retain the contiguous portions of the pawls, said pawls being disposed substantially chordwise at one side of the axis of said elements, and means, operable upon relative axial displacement of the element, to prevent endwise or axial impingement of said abutment and either of said pawls.

6. In a connection for clutching a shaft element to a gear or wheel element coaxial therewith, and in connection with which, one of the elements is axially displaceable to effect a connection therebetween, a pair of pawls carried by one of said elements, an abutment structure providing pawl seats and movable between the pawls, the abutting margins of said pawls being of rounded or curved aspect, and the abutment structure being provided with correspondingly grooved surfaces adapted to receive and seat the curved pawl portions, when the elements are relatively moved to bring said abutment structure into operative relation with the pawls.

7. In a connection for clutching a shaft element to a gear or wheel element coaxial therewith, and in connection with which one of the elements is axially displaceable to effect a connection therebetween, a pair of pawls carried by one of the said elements, an abutment structure providing pawl seats, and movable between the pawls, the abutting margins of each of said pawls being of rounded or curved aspect, the abutment structure being provided with correspondingly grooved surfaces adapted to receive and seat the curved pawl portions, and curved pawl-deflecting surfaces disposed at the ends of said abutment structure and adapted to deflect the pawls except when the abutment structure is angularly so positioned as to be operatively engaged by the pawls.

8. A connection for clutching a shaft element to a gear or wheel element coaxial with the shaft, and in connection with which the elements are relatively axially displaceable to effect clutching connection therebetween, the wheel element being provided with an axial opening forming a bore therethrough, two pairs of pawls, pivotally mounted within the wheel element, the pawls of each pair being normally disposed in alignment chordwise of said bore, a spring for each pawl tending to force the pawls of each pair into aligned relation, a pocket for each pawl into which the pawl is adapted to be pivotally deflected against the loading of its spring, to bring the pawl substantially out of the bore, shoulders formed adjacent the bore and constituting stops for limiting the angular movement of the pawls, each of the pawls being provided at its innermost end with a blunt, rounded driving edge, a clutching head carried by the shaft element, and having angularly spaced radial abutments of an axial length corresponding substantially to that of the pawls, each of said abutments being characterized by recesses or grooves adapted to receive and seat the rounded driving edges of the pawls, the spacing of the pawls of each pair and the width of each of said abutments being such that, upon axial movement of one of the said wheel or shaft elements, the abutments are each receivable between and substantially in bridging relation to a pair of the pawls, and a camming surface at each opposite end of each of said abutments, adapted, upon relative axial displacement of the elements, to deflect the pawls toward the pockets therefor, except when the elements are angularly so positioned as to receive the abutments between the paired pawls.

EUGENE S. BUSH.